United States Patent [19]

Heitmann et al.

[11] Patent Number: 4,662,214
[45] Date of Patent: May 5, 1987

[54] METHOD AND APPARATUS FOR TESTING ROD-SHAPED ARTICLES OF THE TOBACCO PROCESSING INDUSTRY

[75] Inventors: Uwe Heitmann, Hamburg; Heinz-Christen Lorenzen, Wentorf; Peter Brand, Hamburg, all of Fed. Rep. of Germany

[73] Assignee: Hauni-Werke Körber & Co. KG, Hamburg, Fed. Rep. of Germany

[21] Appl. No.: 732,386

[22] Filed: May 9, 1985

[30] Foreign Application Priority Data

May 24, 1984 [DE] Fed. Rep. of Germany ....... 3419380

[51] Int. Cl.$^4$ ............................................. G01N 15/08
[52] U.S. Cl. ............................................. 73/38; 73/41
[58] Field of Search ............... 73/38, 41, 45.1, 45.2, 73/45

[56] References Cited

U.S. PATENT DOCUMENTS

| | | | |
|---|---|---|---|
| 3,948,084 | 4/1976 | Heitmann et al. | 73/41 |
| 4,120,194 | 10/1978 | Reuland | 73/45.2 |
| 4,154,090 | 5/1979 | Heitmann et al. | 73/45.1 X |
| 4,287,754 | 9/1981 | Heitmann et al. | 73/45.1 X |

FOREIGN PATENT DOCUMENTS 1284342 11/1968 Fed. Rep. of Germany .......... 73/41

Primary Examiner—Stewart J. Levy
Assistant Examiner—Joseph W. Roskos
Attorney, Agent, or Firm—Peter K. Kontler

[57] ABSTRACT

The wrappers of filter cigarettes are tested during transport in the peripheral flutes of a drum-shaped conveyor through a testing station where at least one end of the wrapper receives air at a previously stabilized pressure. The stabilized pressure is monitored by an electropneumatic transducer which further monitors the pressure differential between the interior and the exterior of the wrapper at the testing station and transmits appropriate signals to a computer which generates test signals by forming a quotient from the signals denoting the pressure differential and the signals denoting the stabilized pressure. The computer can further process and evaluate signals denoting a selected reference pressure as well as the pressure of air which is used to reduce the likelihood of leakage of air from the interior of the wrapper at the testing station.

37 Claims, 14 Drawing Figures

METHOD AND APPARATUS FOR TESTING ROD-SHAPED ARTICLES OF THE TOBACCO PROCESSING INDUSTRY

BACKGROUND OF THE INVENTION

The present invention relates to a method of and to an apparatus for testing rod-shaped articles of the tobacco processing industry. More particularly, the invention relates to improvements in a method of and in an apparatus for testing the tubular wrappers of rod-shaped articles of the tobacco processing industry. Still more particularly, the invention relates to improvements in a method of and an apparatus for ascertaining the condition of wrappers by establishing a pressure differential between the interior and the exterior of the wrappers of successive articles, by detecting those changes of the pressure differential which are attributable to leaks in the wrappers, by generating first signals which are indicative of such changes of pressure differential, by monitoring a comparison or reference pressure, by generating second signals denoting the monitored comparison or reference pressure, and by thereupon processing the first and second signals to form test signals which are indicative of the quality of tested wrappers.

It is already known to practice a method of the above outlined character in an apparatus wherein a testing conveyor (particularly a rotary drum-shaped testing conveyor) transports a succession of rod-shaped articles of the tobacco processing industry sideways (i.e., at right angles to the axes of the respective articles) toward, through and beyond a testing station, wherein at least one end portion of the wrapper of the article advancing through the testing station is in engagement with a sealing element which is designed to prevent uncontrolled escape of testing fluid and/or uncontrolled admission of atmospheric air into the wrapper of the article at the testing station, wherein at least one conduit admits pressurized testing fluid into the wrapper of the article at the testing station so as to establish a pressure differential between the interior and the exterior of such wrapper, with signal generating pressure monitoring means for ascertaining the pressure of testing fluid which is being supplied into the wrapper of the article at the testing station, and with means for evaluating the signals which are transmitted by the monitoring means and for processing such signals to generate test signals denoting the condition of the wrappers of tested articles. Rod-shaped articles of the tobacco processing industry which can be tested in the just described apparatus include plain and filter cigarettes, filter rod sections, plain or filter cigarillos, plain or filter cigars, cheroots, papyrossi and/or other types of smokable articles or constituents of smokable articles wherein tobacco and/or filter material is confined in a tubular wrapper. For the sake of simplicity, the following description of conventional methods and apparatus will deal primarily or exclusively with the testing of filter cigarettes, especially filter cigarettes of the type wherein the wrapper portion surrounding the filter material is provided with one or more annuli of so-called ventilation holes serving to admit atmospheric air into the column of tobacco smoke.

As a rule, filter cigarettes as well as other types of rod-shaped articles of the tobacco processing industry are tested prior to discharging them from the maker (e.g., from a filter tipping machine) in order to ascertain the integrity or lack of integrity of the wrappers. The defects which are to be detected or which should be detected include, among others, insufficient or excessive permeability of the ventilating zone, open seams, frayed ends of the wrappers, holes or tears in the material of the wrappers and/or any possible combination of the just enumerated defects. As a rule, the testing operation involves the admission or evacuation of testing fluid at one end of the wrapper so as establish a pressure differential between the interior and the exterior of the wrapper, and monitoring of the thus established pressure differential. Deviations of the ascertained pressure differential from a reference value are indicative of defective wrappers, and the articles containing defective wrappers are normally segregated from other (satisfactory) articles if the deviation of the monitored pressure differential from a desired or optimum pressure differential exceeds a predetermined value. The pressure differential can be monitored and the signals which are generated by the monitoring means can be evaluated to ascertain the degree of ventilation as well as the presence or absence of other defects in the wrappers.

It is already known to eliminate or reduce the influence of drift phenomena in the pressure monitoring devices (e.g., electropneumatic transducers). Such drift phenomena can develop as a result of changes in temperature, contamination of the monitoring devices and/or of the pneumatic system of the testing apparatus and/or certain other undesirable influences. For example, it was proposed to carry out a reference pressure measurement following each testing operation and to subtract the thus obtained signals from the signals denoting the ascertained pressure differential during the preceding testing operation. As a rule, the reference pressure is atmospheric pressure. The signal which is indicative of the difference between the signal which denotes the pressure differential between the interior and the exterior of the wrapper of an article at the testing station and the signal which denotes the reference pressure is devoid of the influence of the aforediscussed drift phenomena, and such difference signal is then processed to obtain the desired test signal (e.g., a signal which can be used to effect segregation of the article having a defective wrapper from other (satisfactory) articles). Reference may be had to commonly owned U.S. Pat. No. 4,120,194.

A comparison of the pressure of testing fluid with the reference pressure can compensate for changes in the characteristics of the measuring instruments, such as pressure transducers. However, the compariosn fails to compensate for many other factors which adversely influence the results of measurements, i.e., which lead to misleading results and segregation of satisfactory articles or retention of defective articles among satisfactory articles. Thus, it is desirable that the drift compensation take place simultaneously with the step or steps of ensuring that the so-called admission pressure of testing fluid (namely the pressure of testing fluid which is being supplied into the wrapper of the article passing through the testing station) be maintained at a constant value. This involves considerable expenses and contributes significantly to the cost of the testing operation. On the other hand, fluctuations of such admission pressure (i.e., deviations from a constant pressure) can greatly influence the accuracy of the testing operation.

OBJECTS AND SUMMARY OF THE INVENTION

An object of the invention is to provide a novel and improved method of testing rod-shaped articles of the tobacco processing industry in such a way that the results of tests cannot be influenced by variables which remain disregarded and uncompensated for in accordance with the presently known methods and in presently known apparatus.

Another object of the invention is to provide a method which renders it possible to obtain highly reliable and accurate test results even if the admission pressure of the testing fluid deviates from an optimum pressure.

A further object of the invention is to provide a method which renders it possible to obtain highly accurate results of tests upon the wrappers of successive rod-shaped articles of the tobacco processing industry even if a number of variables which can adversely influence the testing operation deviate from optimum values.

An additional object of the invention is to provide a novel and improved apparatus for the practice of the above outlined method and to construct and assemble the apparatus in such a way that it can simultaneously monitor and indicate the results of monitoring of several different characteristics of the wrappers of successively tested articles.

Still another object of the invention is to provide the apparatus with novel and improved means for supplying a wide assortment of information to a small number of monitoring devices.

A further object of the invention is to provide a novel and improved conveyor for rod-shaped articles of the tobacco processing industry which can be utilized in the above outlined apparatus.

An additional object of the invention is to provide a novel and improved method of evaluating the results of tests which are carried out upon the wrappers of successive rod-shaped articles of the tobacco processing industry in a maker, e.g., of the wrappers of filter cigarettes in a filter tipping machine.

Another object of the invention is to provide a testing apparatus which can eliminate the adverse influence of variable parameters which remain disregarded during testing of such articles in heretofore known apparatus.

One feature of the invention resides in the provision of a method of testing the condition of open-ended wrappers of a series of rod-shaped articles of the tobacco processing industry. The improved method comprises the steps of admitting a gaseous testing fluid into the wrappers of successive articles of the series (either through the one or through the other open end or through both open ends) so as to establish between the interior and the exterior of each wrapper a pressure differential which is indicative of the condition of the respective wrapper (the pressure differential will normally decrease if the permeability of the wrapper is excessive so that the testing fluid can flow through the wrapper at a rate which is indicative of excessive flow of fluid through the ventilation openings, through an open seam, through one or more holes in the wrapper and/or along the frayed end or ends of the wrapper), monitoring the pressure differential for each wrapper and generating first signals denoting the monitored pressure differentials, generating a succession of comparison signals, and processing the first signals and the reference signals including forming quotient signals and converting the quotient signals into test signals (such test signals can be used for segregation of defective articles from satisfactory articles and/or for adjustment of the machine or apparatus wherein the rod-shaped articles are produced and/or treated).

The step of generating comparison signals preferably comprises establishing a source of testing fluid for admission into the wrappers of successive articles, stabilizing the pressure of testing fluid in the source (e.g., in a manner as disclosed in the commonly owned copending patent application Ser. No. 565,275 filed Dec. 27, 1983 by Uwe Heitmann et al. now U.S. Pat. No. 4,558,586), and generating signals which constitute the comparison signals and denote the stabilized pressure of testing fluid in the source.

The method can further comprise the steps of generating a succession of reference signals each of which is indicative of a predetermined fluid pressure (preferably of the pressure of atmospheric air), converting the reference signals and the first signals into first difference signals, and converting the comparison signals and the reference signals into second difference signals. The forming step then preferably includes converting the first and second difference signals into quotient signals. The just discussed method preferably further comprises the steps of generating averaged reference signals each of which is indicative of the average value of a plurality of successive reference signals, and utilizing such averaged reference signals for the generation of first and second difference signals. Still further, such method preferably also comprises the steps of generating averaged comparison signals each of which is indicative of the average value of a plurality of successive comparison signals, and utilizing the averaged comparison signals for the generation of second difference signals.

The admitting step preferably includes maintaining the testing fluid at a given pressure (which is a function of the stabilized pressure of testing fluid in the aforementioned source), and the method can further comprise the steps of sealing at least one open end of each wrapper in the course of the admitting step as well as in the course of the next-following monitoring step so as to pneumatically segregate the interior of the wrapper from the surrounding area in the course of the monitoring step, establishing a supply of fluid medium (e.g., atmospheric air, the same as the testing fluid) around the one end of each wrapper in the course of the admitting and monitoring steps, and maintaining such fluid medium at a compensating pressure which matches or closely approximates the given pressure so as to minimize leakage of testing fluid at the one end of the wrapper in the course of the admitting and monitoring steps. Such method can further comprise the step of generating a signal denoting the compensating pressure of the fluid medium in alternation with predetermined successive monitoring steps, e.g., each monitoring step or each second or third monitoring step can be followed by the generation of one or more signals denoting the compensating pressure. It is preferred to utilize one and the same pressure transducer (preferably an electropneumatic transducer such as a diaphragm transducer) for the generation of each and every signal.

The monitoring steps can be carried out alternatingly with the generation of comparison and/or reference signals. For example, successive monitoring steps can be carried out alternatingly with the generation of one or more successive reference signals and/or comparison signals and/or signals denoting the comparison pressure. All such signals can be generated by one and the same pressure transducer, such as the aforementioned electropneumatic diaphragm transducer.

The method can further comprise the steps of ascertaining the pressure differential for each wrapper independently of the aforementioned monitoring step and generating additional signals which are indicative of the thus ascertained pressure differentials. The processing step then preferably includes modifying the additional signals as a function of the characteristics of the quotient signals. Such method can further comprise the step of generating a succession of reference signals in a predetermined sequence with the generation of first signals and comparison signals by means of one and the same pneumatic transducer, and the forming step then preferably includes storing predetermined numbers of first signals, reference signals and comparison signals and converting the stored signals into quotient signals.

The first signals and the comparison signals can be generated by discrete first and second pneumatic transducers, and such method can further comprise the step of generating, by each of the first and second transducers, a succession of reference signals each of which is indicative of a predetermined fluid pressure. The forming step then preferably includes converting the first signals and the reference signals which are generated by the first transducer into first difference signals, converting the comparison signals and the reference signals which are generated by the second transducer into second difference signals, and converting the first and second difference signals into quotient signals.

Another feature of the invention resides in the provision of a testing apparatus for ascertaining the condition of open-ended wrappers of a series of rod-shaped articles of the tobacco processing industry. The apparatus comprises conveyor means for transporting the articles of the series along a predetermined path (preferably in such a way that the direction of transport is at right angles to the axes of the transported articles), control means for establishing a pressure differential between the interior and the exterior of the wrapper of each article of the series while such wrapper advances along a predetermined portion of the path (the control means can comprise first and second flanges at the axial ends of a rotary drum-shaped conveyor means and first and second stationary valve plates which flank the conveyor means and are outwardly adjacent to and in sealing engagement with the respective flanges), means for monitoring the pressure differential for each wrapper and for generating first signals which denote the respective pressure differentials, a source of gaseous fluid, means for generating comparison signals denoting the pressure of gaseous fluid in the source, and means for evaluating the first signals and the comparison signals and for forming test signals denoting the quotient of the first signals and comparison signals. The source preferably includes or constitutes a device for stabilizing the pressure of gaseous fluid, and the comparison signals then denote such stabilized pressure. The control means includes means for supplying gaseous fluid at stabilized pressure from the source into at least one end of the wrapper which advances along the predetermined portion of the path. Such apparatus can further comprise an air compressor or another suitable source of compressed gaseous fluid and means (e.g., a conduit with a valve therein) for supplying gaseous fluid from the source of compressed fluid to the pressure stabilizing device.

The control means can comprise at least one mobile component (such as the aforementioned flange or flanges of the conveyor means) which shares the movements of the conveyor means and at least one stationary component (such as the aforementioned valve plate or valve plates) which is adjacent to the mobile component and is connected to the source of gaseous fluid at stabilized pressure as well as to the signal generating means. The components of the control means have means (e.g., in the form of slots, holes, recesses, bores, channels or the like) for connecting the signal generating means with the pressure stabilizing device and with the interior of the wrapper which advances along the predetermined portion of the path. Such apparatus can further comprise means for generating reference pressure signals (e.g., signals denoting the pressure of atmospheric air), and the evaluating means is preferably arranged to process the reference pressure signals together with the first signals and the comparison (stabilized pressure) signals. In accordance with a presently preferred embodiment of the invention, the evaluating means comprises means for forming first difference signals from the first signals and reference signals, for forming second difference signals from the reference signals and comparison signals, and for forming a quotient of the first and second difference signals. Still further, the evaluating means can comprise means for converting predetermined numbers of successively generated reference signals into averaged reference signals and for converting a plurality of successively generated comparison signals into averaged comparison signals. The first difference signals are then formed from the first signals and averaged reference signals, and the second difference signals are then formed from the averaged comparison signals and averaged reference signals.

The evaluating means can comprise a commercially available computer (e.g., a microcomputer) and an interface which connects the computer with the signal generating means.

The apparatus can further comprise means for equalizing or distributing the pressure of gaseous fluid on its way from the pressure stabilizing device to the predetermined portion of the path. Such pressure equalizing means can comprise at least one compartment which is provided in the control means and means (e.g., a nozzle with a plurality of minute apertures) for connecting the compartment with the atmosphere.

The means for connecting the interior of the pressure stabilizing device with the control means can comprise a throttle which can be adjusted to select the sensitivity of the testing apparatus. For example, the throttle can be formed with a plurality of apertures for admission of gaseous fluid from the pressure stabilizing device into the connecting means (the latter can constitute a rigid or a flexible conduit) and mechanically, electromagnetically or otherwise operated means for selectively sealing at least one of the apertures to thereby vary the rate of flow of gaseous fluid from the pressure stabilizing device to the control means and thence into the wrappers advancing along the predetermined portion of the path.

The testing apparatus preferably further comprises a housing or other suitable means defining a compensating chamber surrounding at least one end of the wrapper in the predetermined portion of the path and means (e.g., a second pressure stabilizing device) for maintaining the pressure in the compensating chamber at a value which at least approximates the pressure in the interior of the wrapper advancing along the predetermined portion of the path. This minimizes the communication between the interior of such wrapper and the surrounding atmosphere during the establishment of pressure differential, i.e., during generation of the first signals. The control means can comprise a sealing element which engages one end of the wrapper advancing along the predetermined portion of the path, and such sealing element can be at least partially confined in the aforementioned compensating chamber so as to reduce the likelihood of leakage of gaseous fluid between the sealing element and the respective end of the wrapper if the seal between such element and the wrapper is not satisfactory. The second pressure stabilizing device can contain a supply of gaseous fluid whose pressure matches or very closely approximates the pressure in the interior of a satisfactory wrapper which advances along the predetermined portion of the path, and conduit means for supplying gaseous fluid from the second pressure stabilizing device to the compensating chamber. The apparatus can be provided with means for generating signals denoting the pressure in the compensating chamber and with means for recording and/or displaying the thus generated signals.

The aforementioned monitoring means can constitute the means for generating the first signals, the comparison signals, the reference signals and the compensating pressure denoting signals.

Alternatively, the monitoring means can constitute or comprise a first transducer which generates the first signals and the comparison signals, and a discrete second transducer which generates additional first signals. The evaluating means then comprises means for modifying the additional first signals by the aforementioned test signals. The first transducer is preferably further utilized to generate reference signals, and the evaluating means is then designed to process the first signals, the reference signals and the comparison signals into test signals which are used to modify the additional first signals.

It is also within the purview of the invention to provide a first transducer which generates first signals and to use a second transducer which generates comparison signals. The control means then preferably further comprises means for effecting the generation of first and second reference signals by the first and second transducer, respectively. The evaluating means of such apparatus preferably comprises means for converting the first signals and the first reference signals into first difference signals, for converting the comparison signals and the second reference signals into second difference signals, and for converting the first and second difference signals into quotient signals. The control means of such apparatus is preferably designed to effect the generation of first reference signals alternatingly with the generation of first signals (by the first transducer) and to effect the generation of second reference signals (by the second transducer) alternatingly with the generation of comparison signals.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 10A illustrates the structure of FIG. 10 but with the testing conveyor in a different angular position.

DESCRIPTION OF THE PREFERRED EMBODIMENTS

Figure 1:
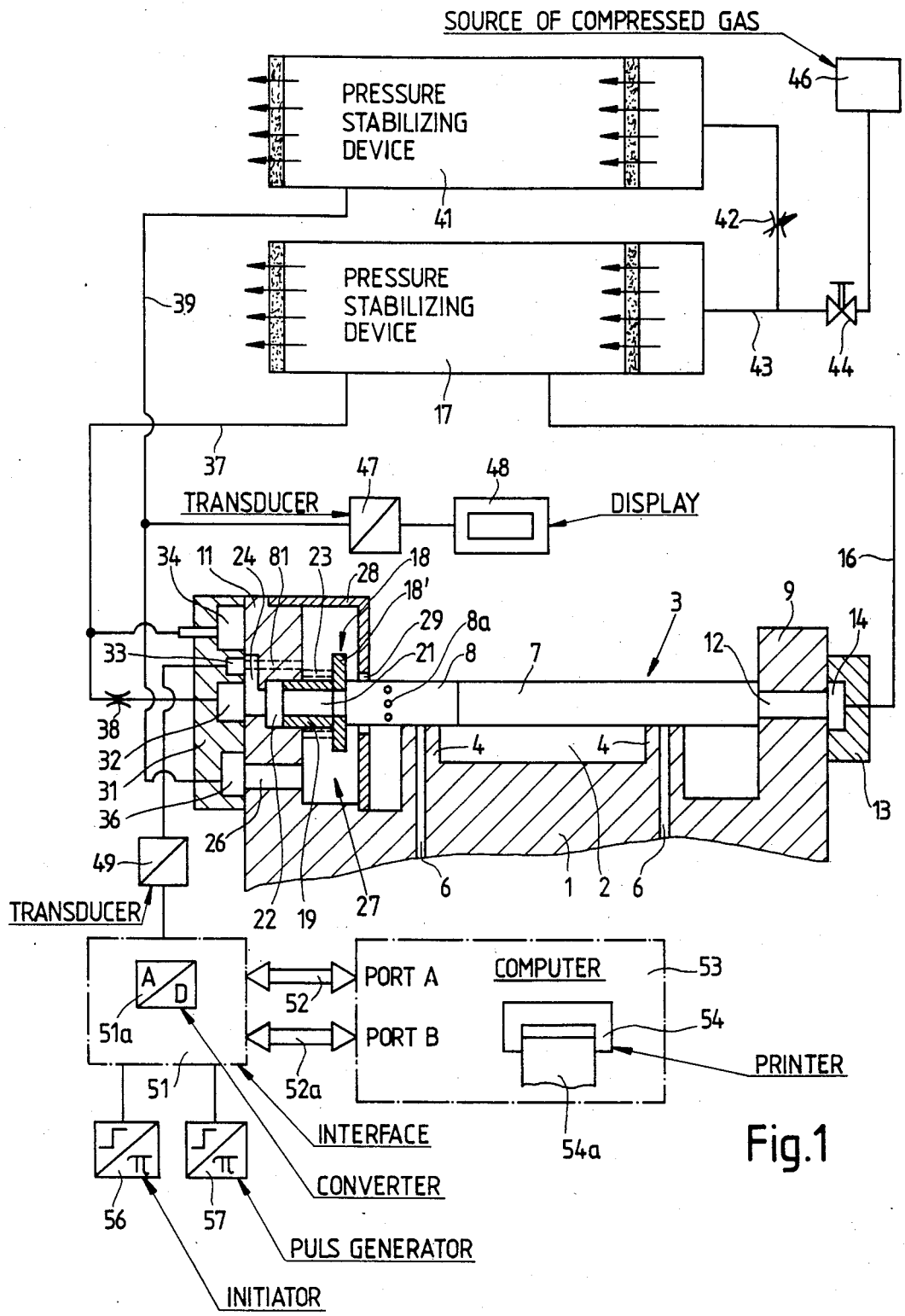
FIG. 1 is a fragmentary partly axial sectional and partly diagrammatic view of a testing apparatus which embodies one form of the invention.

FIG. 1 shows schematically a portion of a testing apparatus which embodies one form of the present invention. The apparatus comprises a conveyor 1 which is a drum, e.g., of the type used in filter tipping machines known as MAX S (manufactured and sold by the assignee of the present application). The periphery of the drum-shaped conveyor 1 is provided with a plurality (e.g., thirty-six) equidistant axially parallel article receiving means in the form of flutes 2. Each flute 2 contains two spaced-apart aligned relatively narrow and relatively short webs or analogous projections 4 each of which is formed with a suction port 6. The end faces of the webs 4 in a flute 2 attract two spaced-apart portions of the wrapper of a rod-shaped article such as a filter cigarette 3. The arrangement is preferably such that one of the webs 4 attracts the filter mouthpiece 8 and the other of the webs 4 in the same flute attracts the tobacco-containing portion 7 of a cigarette 3. That portion of the wrapper of the cigarette 3 shown in FIG. 1 which surrounds the filter material within the mouthpiece 8 is provided with an annulus of ventilating holes 8a serving to admit atmospheric air into the column of tobacco smoke. The manufacturers of cigarettes believe that the admission of atmospheric air into the tobacco smoke reduces the deleterious effects of nicotine and condensate. The manner in which the suction ports 6 are connected to a suction generating device in order to ensure that the corresponding webs 4 can attract filter cigarettes 3 in the respective flutes 2 during a certain stage of each revolution of the conveyor 1 is well known and need not be described here. The filter cigarettes 3 are admitted into successive flutes 2 at a first station (e.g., from the flutes of a second drum-shaped conveyor), and the tested filter cigarettes leave the respective flutes 2 at a second station to enter the flutes of a third drum-shaped conveyor or to be deposited on the upper reach of a belt conveyor, not shown.

The webs 4 are small because this ensures that they are highly unlikely to seal holes or other defective portions (if any) of the respective wrappers in the course of the testing operation. In other words, the major part of the wrapper in a flute 2 is fully exposed so that the pressure along the exterior of such wrapper is constant from end to end.

The end portions of the drum-shaped conveyor 1 constitute two radially outwardly extending disc-shaped flanges 9 and 11. In lieu of being provided with such integral flanges, the conveyor for the transport of rod-shaped articles 3 through the testing station can comprise or cooperate with a pair of wobble plates in a manner as disclosed, for example, in commonly owned U.S. Pat. No. 3,948,084. The flange 9 is formed with an annulus of bores 12, one for each of the flutes 2 and each in register with the adjacent end portion of the article 3 in the respective flute. The bores 12 communicate with the interior of the tubular wrappers of articles 3 in the respective flutes 2 in that the corresponding end faces of the articles are caused to bear against the inner side of the flange 9. That (outer) side of the flange 9 which faces away from the flutes 2 is in contact with one side of a stationary control member here shown as a valve plate 13 having arcuate slots 14 which are connected with a pressure stabilizing device 17 by conduits 16.

The testing apparatus further comprises a set of sealing elements 18, one for each flute 2 and each disposed at the inner side of the flange 11 opposite one of the bores 12 in the flange 9. Each sealing element 18 has a cylindrical sleeve 19 which is axially movably received in a bore 22 or socket of the flange 11, a head 18' which is caused to bear against the adjacent end face of the filter mouthpiece 8 in the respective flute 2 under the action of a coil spring 23 reacting against the inner side of the flange 11 and bearing against the adjacent side of the head 18', and an axial bore 21 which communicates with the interior of the wrapper of the article 3 in the respective flute 2. The bore 21 of each sealing element 18 is in axial alignment with a discrete bore 12 of the flange 9.

Each bore 22 of the flange 11 communicates with a discrete radially outwardly extending slot 24 which is machined into the outer side of the flange 11, namely into that side of the flange 11 which faces away from the flange 9 and flutes 2. The flange 11 is further formed with an annulus of additional axially parallel bores 26 which are disposed radially inwardly of the respective bores or sockets 22. The inner side of each bore 26 communicates with a compensating chamber 27 which is surrounded by a housing 28 carried by the central portion of the drum-shaped conveyor 1 and/or by its flange 11 and having an opening 29 for admission of one end portion of the filter mouthpiece 8 in the respective flute 2.

The outer side of the flange 11 is in sealing frictional contact with a second control member in the form of a stationary valve plate 31. That side of the valve plate 31 which contacts the flange 11 is formed with several slots which extend in the circumferential direction of the conveyor 1 and of which the slots 32, 33, 34 and 36 can be seen in FIG. 1. The slots 32 and 34 are connected with the pressure stabilizing device 17 by conduits 37. Those branches of the conduits 37 which lead to the slots 32 contain flow restrictors 38. The slots 36 are connected with a pressure stabilizing device 41 by one or more conduits 39, and the second pressure stabilizing device 41 is connected with a source 46 of compressed gaseous testing fluid (normally air) by a conduit 43 containing an adjustable flow restrictor 42. The conduit 43 further serves to directly connect the source 46 with the pressure stabilizing device 17 and contains a shutoff valve 44. The conduit 39 is further connected with the input of an electropneumatic transducer 47 whose output is connected with a display unit 48.

The slots 33 of the valve plate 31 are connected with the input of an electropneumatic transducer 49 whose output is connected with an evaluating unit including an interface 51 and a computer 53 whose ports A and B are connected with the interface 51 by bus bars 52 and 52a. An output of the computer 53 is connected with a printer 54 which can record the results of evaluation on a tape 54a. The interface 51 is further connected with an initiator 56 which generates pulses in dependency on the revolutions of the conveyor 1 and with a timing pulse generator 57 which transmits timing pulses.

The control means of the testing apparatus comprises two mobile components (namely the flanges 9 and 11) and two stationary components (namely the valve plates 13 and 31). Such control means serves to connect the pressure stabilizing device 17 with the wrappers of the articles 3 being tested in the space between the valve plates 13, 31 and with the transducer 49, and for connecting the pressure stabilizing device 41 with the chamber or chambers 27. The manner in which the sealing elements 18 are disengaged from the respective ends of the adjacent wrappers upon completion of the testing operation is well known and is not shown in the drawing. Reference may be had to numerous Letters Patent of the assignee of the present application. For example, each sealing element 18 can be provided with a roller follower which tracks a stationary disc cam mounted in the frame of a filter tipping machine adjacent to the path of movement of the sealing elements 18 to disengage the heads 18' of successive sealing elements from the adjacent end faces of articles 3 in the corresponding flutes 2 before the freshly tested articles reach the transfer station where they are accepted by a further conveyor, e.g., for delivery to a packing machine.

Figure 2:
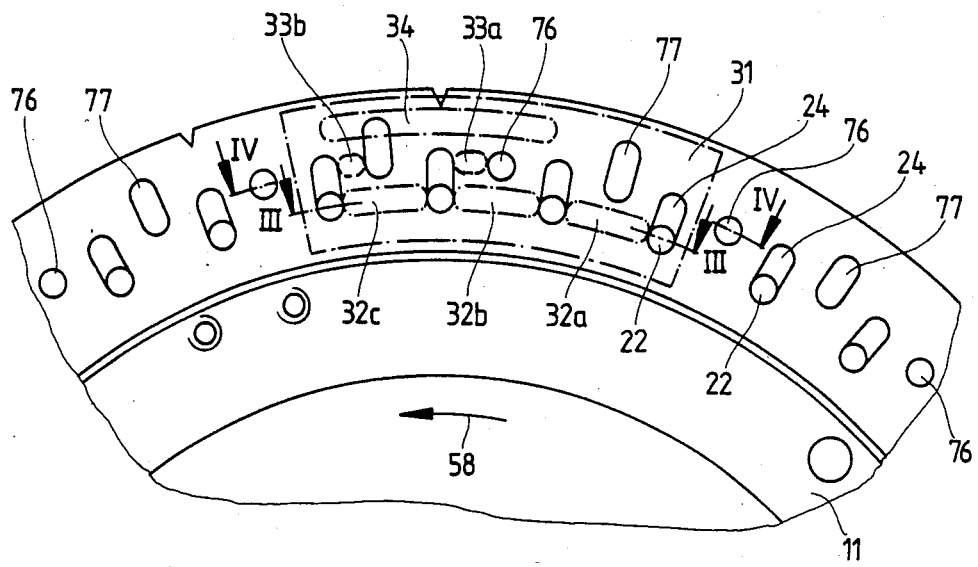
FIG. 2 is a fragmentary end elevational view of the apparatus as seen from the left-hand side of FIG. 1.

FIG. 2 shows one presently preferred embodiment of the flange 11 of the drum-shaped conveyor 1 as seen from the left-hand side of FIG. 1. The outline of the corresponding valve plate 31 is indicated by phantom lines. The flange 11 is driven to rotate in the direction of arrow 58 and is formed with the aforementioned annulus of equidistant bores or sockets 22, one for each flute 2 of the conveyor 1. As already explained in connection with FIG. 1, the outer end portions of the bores 22 (namely the end portions which are nearer to the valve plate 31) communicate with radially outwardly extending slots 24 which are machined into the outer side of the flange 11. The number (e.g., thirty-six) of bores 22 matches the number of slots 24 and flutes 2.

Figure 3:
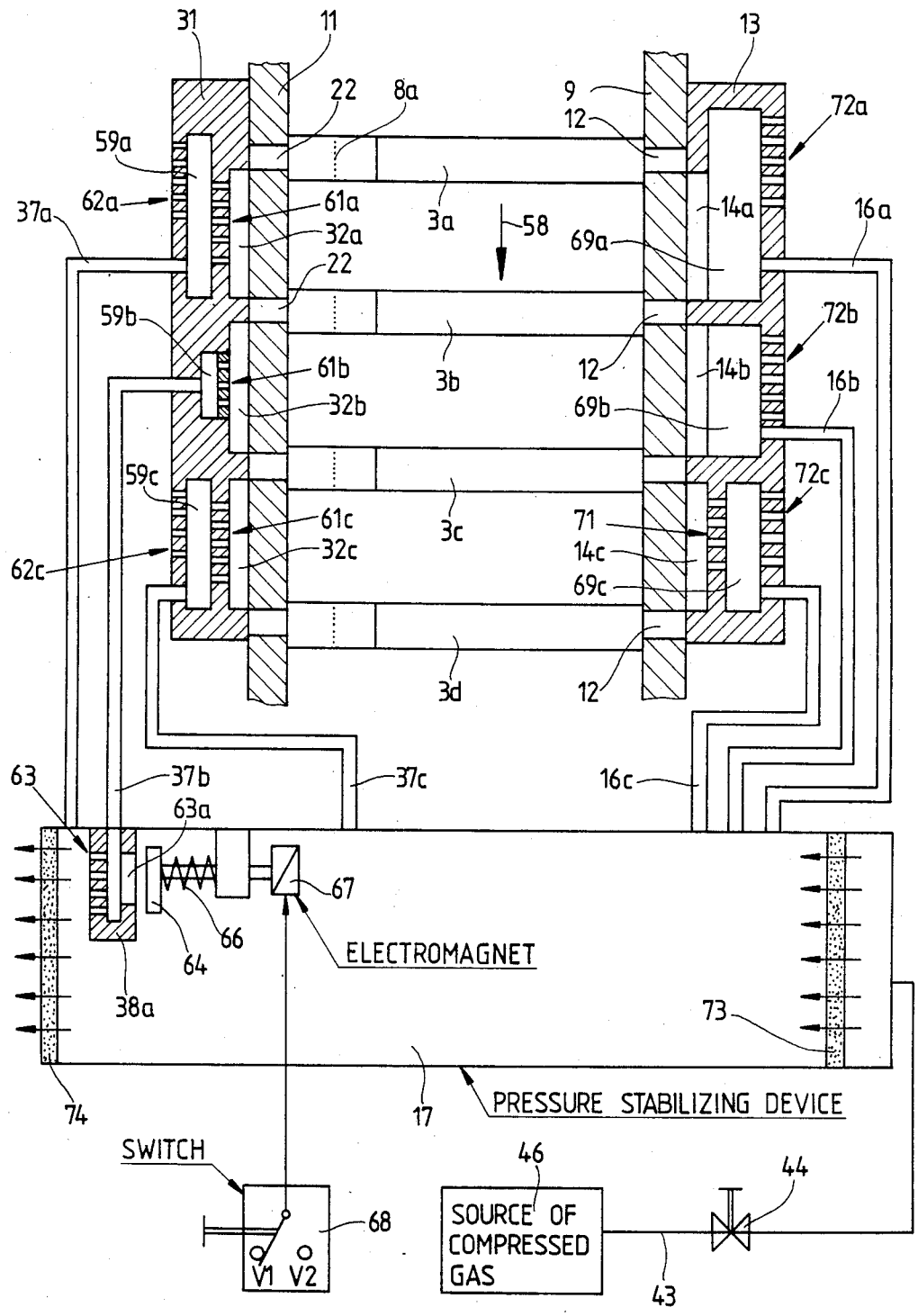
FIG. 3 is a developed sectional view as seen in the direction of arrows from the line III—III of FIG. 2.

The valve plate 31 is formed with three elongated slots 32a, 32b, 32c which extend in the circumferential direction of the flange 11, i.e., along the line III—III which is shown in FIG. 2 and denotes the location of the sectional view of FIG. 3. The slots 32a to 32c are provided in that side of the valve plate 31 which abuts against the flange 11. The distance between the axis of the conveyor 1 and the slots 32a to 32c is the same as the distance between such axis and the bores 22 so that successive bores 22 come into register with successive slots 32a, 32b, 32c when the conveyor 1 is set in motion to rotate in the direction of arrow 58.

FIG. 3 (which is an enlarged sectional view along the line III—III of FIG. 2) shows that the slots 32a to 32c of the valve plate 31 communicate with the pressure stabilizing device 17 by way of conduits 37a, 37b, 37c and so-called air showers 61a, 61b, 61c. Each air shower can be said to constitute a nozzle with a plurality of small-diameter bores or holes. The discharge ends of the conduits 37a to 37c communicate with the respective air showers 61a to 61c by way of discrete pressure distributing or equalizing compartments 59a, 59b, 59c which are machined into the valve plate 31a. The purpose of the air showers 61a to 61c is to ensure the buildup of a homogeneous testing pressure in the slots 32a to 32c of the valve plate 31, i.e., such air showers prevent the development of pressure gradients which could adversely influence the testing operation.

The pressure equalizing compartments 59a to 59c communicate with the respective conduits 37a to 37c and they also communicate with the respective slots 32a to 32c by way of the corresponding air showers 61a to 61c. The pressure equalizing compartments 59a and 59b communicate with the atmosphere by way of the orifices of two discrete nozzles 62a and 62c which are integral parts of the valve plate 31 and each of which has a plurality of small-diameter bores or holes connecting the respective pressure equalizing compartment with the atmosphere. The conduit 37b for the pressure equalizing compartment 59b communicates with the pressure stabilizing device 17 by way of an adjustable throttle 38a.

The combined cross-sectional area of bores in the nozzles 62a and 62c is so small that they allow for the establishment of contemplated optimum pressure in the respective pressure equalizing compartments 59a and 59c. The purpose of the nozzles 62a and 62c is to suppress undesirable oscillations of the pneumatic testing system.

The effective cross-sectional area of the throttle 38a is adjustable in order to allow for a shifting of the measuring range. This throttle has a group of small-diameter apertures or bores 63 and a larger-diameter bore or aperture 63a. The means 64 for sealing the aperture 63a in order to shift the measuring range comprises a sealing device which is biased toward the aperture 63a by a coil spring 66 and can be retracted against the opposition of the coil spring 66, to expose the aperture 63a, by an electromagnet 67 in response to actuation of a control element in the form of a switch 68.

FIG. 3 further shows the details of the valve plate 13 which is adjacent to and bears against the outer side of the flange 9. That side of the valve plate 13 which contacts the outer side of the flange 9 is formed with three elongated slots 14a, 14b, 14c which extend in the circumferential direction of the flange 9 and register seriatim with successive bores 12 of the flange 9 when the conveyor 1 including the flanges 9 and 11 is set in motion.

The slots 14a, 14b, 14c respectively communicate with pressure equalizing compartments 69a, 69b, 69c which are connected with the pressure stabilizing device 17 by conduits 16a, 16b, 16c. A pneumatic throttle 71 is provided in the valve plate 13 between the pressure equalizing compartment 69c and the slot 14c; this throttle comprises a large number of small-diameter bores or holes. Furthermore, the pressure equalizing compartments 69a to 69c are connected with the atmosphere by discrete nozzles 72a, 72b, 72c each of which comprises a large number of small-diameter orifices. The combined cross-sectional area of orifices in the nozzles 72a to 72c is selected in such a way that they allow for the establishment and maintenance of requisite pressure in the respective pressure equalizing compartments 69a to 69c. The purpose of the nozzles 72a to 72c is the same as that of the nozzles 62a and 62c, i.e., they prevent undesirable oscillations of the pneumatic testing system.

The pressure stabilizing device 17 can be said to constitute a plenum chamber designed to ensure that the pressure therein remains constant or at least substantially constant in order to guarantee the achievement of optimal (undistorted) test results. A presently preferred embodiment of the device 17 is described and shown in detail in the commonly owned copending patent application Ser. No. 565,275 filed Dec. 27, 1983 by Uwe Heitmann et al. As mentioned above, the device 17 receives gaseous testing fluid from the source 46 by way of the conduit 43 which contains the shutoff valve 44. The conduit 43 discharges the testing fluid at the right-hand side (as viewed in FIG. 3) of a foraminous end wall 73 which has a large number of minute and finely distributed passages for the flow of testing fluid into the main portion of the pressure stabilizing device between the wall 73 and a similar wall 74 which latter provides a large number of minute and finely distributed passages for evacuation of testing fluid into the atmosphere. The relationship of permeabilities of the walls 73 and 74 is selected in such a way that the pressure of fluid in the main portion of the device 17 between the walls 73 and 74 is constant (stable) and matches a desired optimum value. The pressure in the main portion of the device 17 can be called stabilized, comparision or admission pressure. The pressure drop across the conduits 16a to 16c and 37a to 37c is small in comparison with the pressure differential at the opposite sides of the wall 74 so that eventual fluctuations of comparison or stabilized pressure do not exert a noticeable influence upon the testing operation.

Figure 4:
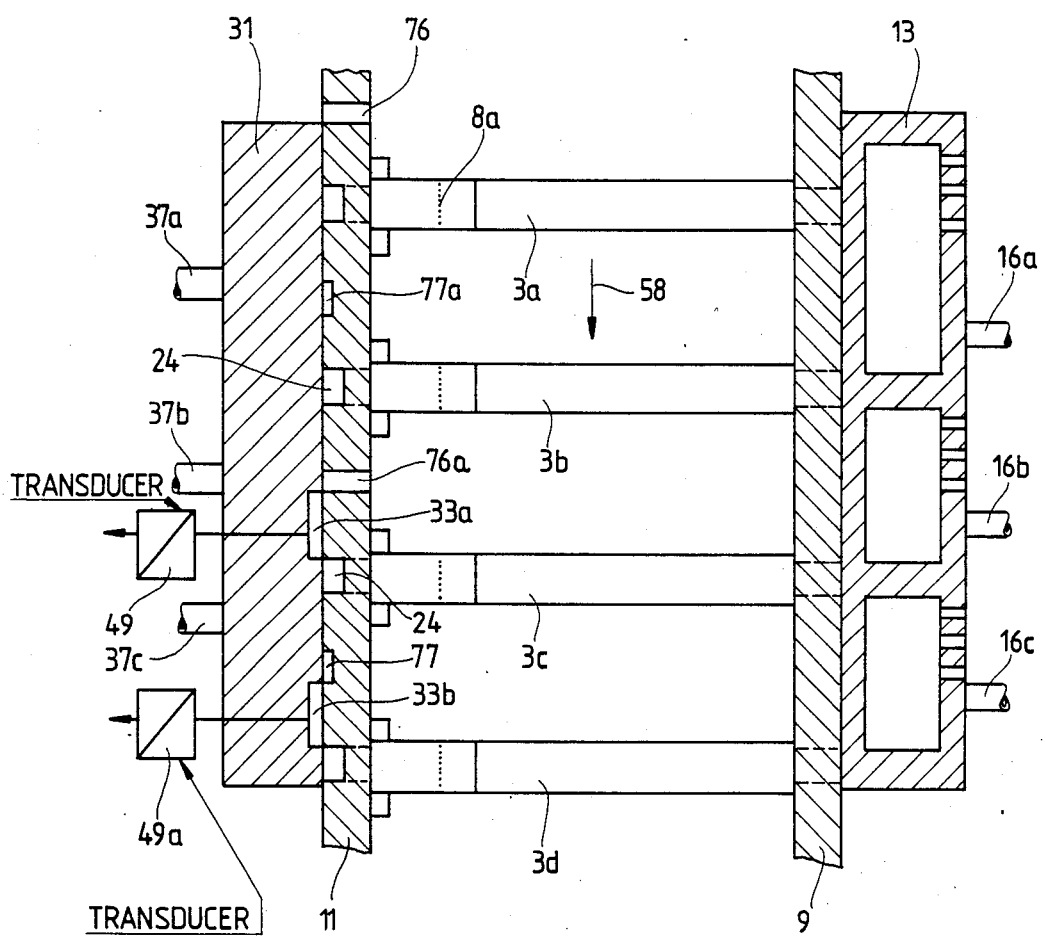
FIG. 4 is a developed sectional view as seen in the direction of arrows from the line IV—IV of FIG. 2.

FIG. 4 is an enlarged sectional view as seen in the direction of arrows from the line IV—IV of FIG. 2. This section is taken radially outwardly of the section along the line III—III and shows that the flange 11 is further formed with reference pressure bores 76 whose mutual spacing is twice the spacing of neighboring bores 22, and with radial slots 77 which alternate with the reference pressure bores 76 and serve as a means for permitting the measurement of stabilized or comparison pressure. The total number of bores 76 is half the total number of bores 22, the same as the total number of radial slots 77.

That surface of the valve plate 31 which is in contact with the outer side of the flange 11a is formed with slots 33a and 33b which are slightly elongated (as considered in the circumferential direction of the flange 11), and the valve plate 31 is further formed with the much longer circumferentially extending slot 34 which is disposed radially outwardly of the slots 33a, 33b and is connected with the pressure stabilizing device 17. The reference pressure bores 76 can communicate directly with the slots 33a and 33b of the stationary valve plate 31, and the slots 33a, 33b are in direct communication with the respective electropneumatic transducers 49 and 49a. The bores 22 can commuhicate directly with the slots 33a, 33b by way of the corresponding radially extending slots 24. The slot 34 (which communicates with the pressure stabilizing device 17) can communicate with the slots 33a and 33b by way of the slots 77 when the flange 11 rotates.

The mode of operation of the testing apparatus of FIGS. 1 to 4 is as follows:

As shown in FIGS. 3 and 4, a rod-shaped article 3a is being transported in the direction of arrow 58 and is in the process of entering the space between the slots 14a and 32a of the respective stationary valve plates 13, 31. The right-hand end portion of the space within the wrapper of the article 3a communicates with the corresponding bore 12 of the flange 9, and the left-hand end portion of such space communicates with the corresponding bore or socket 22 of the flange 11. The testing station is located between the valve plates 13 and 31. When the bores 12, 22 at the corresponding axial ends of the article 3a respectively begin to communicate with the slots 14a, 32a, the interior of the wrapper of such article receives testing fluid from the pressure stabilizing device 17 by way of the corresponding conduits 16a and 37a. In other words, the pressure in the interior of the wrapper of the article 3a rises to match the testing pressure i.e., it can be said that the wrapper of the article 3a undergoes a preliminary inflation. The thus established pressure in the wrapper of the article 3a remains largely unchanged while the article advances in the direction of the arrow 58 toward the position occupied by the article 3b of FIGS. 3 and 4, i.e., toward a position in which the corresponding bores 12 and 22 respectively communicate with the slots 14b and 32b. Since the slots 14b and 32b also communicate with the pressure stabilizing device 17 (by way of the conduits 16b and 37b), the wrapper of the article 3a (in the position occupied by the article 3b of FIGS. 3 and 4) is reinflated or subjected to a secondary inflating or blowing treatment. However, and since the pressure in the wrapper of the article 3a was already increased to stabilized or comparison pressure during travel of the corresponding bores 12, 22 past the slots 14a and 32a, the admission of testing fluid via slots 14b and 32b actually amounts to a compensation for pressure losses which might have taken place during transport of the article 3a from the position between the slots 14a, 32a to the position between the slots 14b, 32b. The pressure in the interior of the wrapper of the article 3a is stabilized during communication of the corresponding bores 12, 22 with the upstream portions of the slots 14b and 32b. When the article 3a thereupon advances between the downstream portions of the slots 32b and 14b, the corresponding radially outwardly extending slot 24 of the rotating flange 11 establishes communication between the slot 32b and the testing slot 33a which latter then connects the interior of the wrapper of the article 3a with the transducer 49. The transducer 49 generates an electric signal which is indicative of the pressure differential between the interior and exterior of the wrapper of the article 3a and transmits such signal to the interface 51 of the evaluating unit. The pressure which is monitored by the transducer 49 is indicative of the degree of ventilation of the wrapper of the article 3a, i.e., of the quantity of atmospheric air which can enter such wrapper by way of the corresponding holes 8a.

When the measurement of the degree of ventilation is completed, the article 3a continues to advance in the direction of the arrow 58 and reaches the position corresponding to that of the article 3c shown in FIGS. 3 and 4. At such time, the corresponding bores 12 and 22 communicate with the slots 14c and 32c, i.e., the interior of the wrapper of the article 3a is again connected with the pressure stabilizing device 17. The pressure in the interior of the wrapper of such article is stabilized while the respective bores 12, 22 communicate with the upstream portions of the slots 14c, 32c and the interior of the wrapper is in communication with the testing slot 33b (by way of the respective radial slot 24) when the respective bore 22 communicates with the downstream portion of the slot 32c. The testing slot 33c communicates with the transducer 49a which generates a signal denoting the integrity or lack of integrity of the wrapper of the article 3a between the downstream portions of the slots 14c and 32c. After the article 3a advances beyond the slots 14c and 32c (i.e., beyond the position occupied by the article 3d in FIG. 3 or 4), it is located outside of the testing station and can be transferred onto the aforementioned third drum-shaped conveyor or onto the aforementioned belt conveyor for evacuation from the testing apparatus.

When an article 3 is located between the slots 14c and 32c, one of the reference pressure bores (designated by the character 76a in FIG. 4) advances into communication with the slot 33a which is connected to the transducer 49 so that the latter generates a corresponding electric reference pressure signal.

When the testing of the degree of ventilation of a preceding article 3 is completed, the radially extending stabilized or comparison pressure measuring slot (denoted by the reference character 77a in FIG. 4) of the rotating flange 11 begins to communicate with the slot 33a and establishes a communication between the slot 33a and the slot 34 which is connected with the pressure stabilizing device 17. The transducer 49 (which is connected with the slot 33a) then generates an electric signal which is indicative of the stabilized or comparison pressure in the device 17. A corresponding determination of the reference pressure and stabilized or comparison pressure takes place thereafter when the slots 76a and 77a move into register with the slot 33b which is connected to the input of the transducer 49a, i.e., with the transducer which is used to ascertain the integrity or the absence of integrity of the wrappers of the articles 3a, 3b, etc.

The reference pressure signals, comparison pressure signals and measurement signals which are transmitted by the output of the transducer 49 are modified in an analog-digital converter 51a of the interface 51 which transmits the thus modified signals to the computer 53 for further processing. The computer 53 is designed to totalize a preselected number of successive reference pressure signals and to generate therefrom an averaged reference pressure signal. Furthermore, the computer 53 totalizes a predetermined number of successive stabilized or comparison pressure signals and generates a signal which is indicative of the average value of totalized stabilized pressure signals. The computer 53 also generates first difference signals denoting the difference between the measurement signal indicating the degree of ventilation of articles 3 and the average value of the reference pressure as well as second difference signals denoting the difference between the average value of stabilized pressure and the average value of reference pressure. The computer 53 also generates signals corresponding to the quotients of the first and second difference signals, and such signals are used as or are processed into test signals. The manner in which the signals which are transmitted by the transducer 49a are processed in the evaluating unit is preferably the same as the just described mode of processing signals which are generated by the transducer 49.

Figure 5:
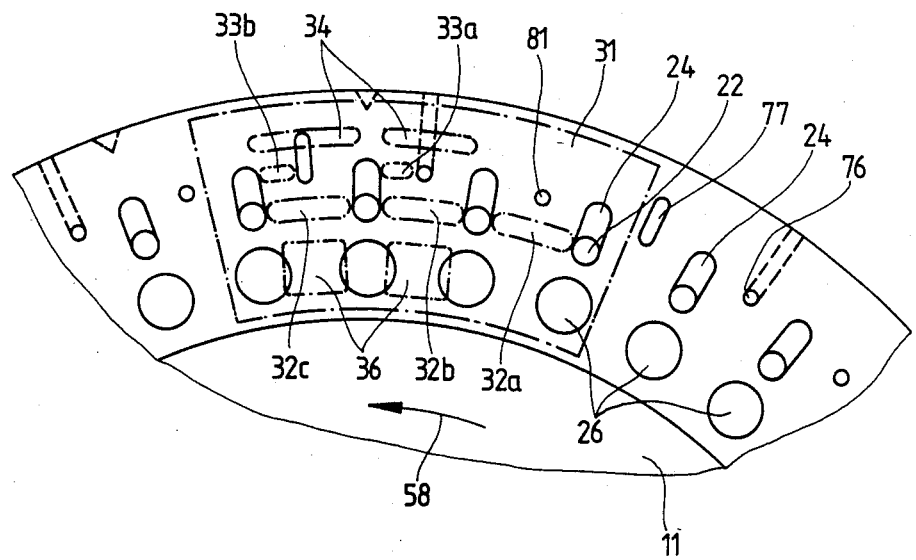
FIG. 5 is a view similar to that of FIG. 2 but showing a portion of a second testing apparatus with means for admitting compensating testing fluid into the compensating chamber.

FIG. 5 shows a portion of the flange 11 and by phantom lines the corresponding stationary valve plate 31. The manner in which the valve plate 31 cooperates with the flange 11 to admit compensating air into the chamber 27 is as follows: The flange 11 is formed with the aforementioned axially parallel bores 26 which are disposed radially inwardly of the respective bores or sockets 22 and communicate with the chamber 27. Successive bores 26 register with the aforementioned slots 36 of the valve plate 31. The slots 36 communicate with the second pressure stabilizing device 41 by way of the conduit or conduits 39. The pressure in the second pressure stabilizing device 41 is or can be different from the pressure in the device 17 due to the provision of the flow restrictor 42 in that portion of the conduit 43 which leads to the inlet of the device 41. The flow restrictor 42 is adjustable so as to conform the pressure in the device 41 to testing pressure in the interior of the wrappers of rod-shaped articles 3.

When a bore or socket 22 begins to communicate with the slot 32b or 32c of the stationary valve plate 31 (for the purpose of ascertaining the degree of ventilation or the integrity or lack of integrity of the wrapper), the respective compensating bore 26 reaches the corresponding slot 36 of the valve plate 31 so that the compensating chamber 27 receives fluid at compensating pressure from the pressure stabilizing device 41 while the corresponding wrapper is being tested during travel past the slots 32b and 32c.

The testing apparatus further comprises the aforementioned transducer 47 which monitors the pressure in the plenum chamber 41 and transmits corresponding electric signals to the display unit 48.

The transducer 47 can be omitted if the flange 11 of the conveyor 1 is formed with an additional annulus of bores or holes 81 (shown in FIG. 5) which connect the compensating chamber 27 at intervals with the transducers 49 and 49a so that the compensating pressure in the chamber 27 can be monitored by the transducers 49 and 49a in lieu of (or in addition to) the transducer 47. The thus ascertained compensating pressure (namely, the compensating pressure which is ascertained by the transducers 49 and 49a) is recorded on the tape 54a issuing from the printer 54. The tape 54a further carries information pertaining to the results of various measurements. The printer 54 can be used in addition to or in lieu of a suitable display unit (not shown) of conventional design. Also, the compensating pressure in the chamber or chambers 27 can be monitored by the transducer 47 (and displayed at 48) as well as by the transducer 49 and/or 49a (and recorded on the tape 54a).

An important advantage of the improved apparatus is that the pressure differential for each article 3, the reference pressure and the comparison pressure are monitored by one and the same pressure transducer 49 or 49a. This contributes significantly to reliability of the measurements. If the conveyor 1 has thirty-six flutes 2, the apparatus carries out thirty-six measurements of pressure differential and thus generates a total of thirty-six signals denoting each revolution of the conveyor.

The reference pressure bores 76 are spaced apart from one another at twice the mutual spacing of neighboring bores 22, the same as the radial slots 77. Thus, the apparatus generates a total of eighteen reference pressure signals and the same number of comparison or stabilized pressure signals per revolution of the conveyor 1. If the compensating pressure is also monitored in a manner as described in connection with FIG. 5, the number of reference pressure signals and compensating pressure signals is reduced to twelve per revolution of the conveyor 1; it has been found that this is still amply sufficient to ensure the achievement of highly reliable test results.

The transducer 49 generates electric signals which denote the degree of ventilation of successive wrappers. If the aperture 63a of the throttle 38 in the pressure stabilizing device 17 is closed in response to deenergization of the electromagnet 67 by the switch 68, the sensitivity of the testing apparatus is set to, for example, a ventilation degree of 90% (the aperture 63a can consist of a large number of small-diameter apertures similar to the holes 63). If a lower ventilation degree is anticipated (e.g., 40%), the electromagnet 67 is energized by the switch 68 to move the sealing member 64 away from the aperture 63a so that the throttle 38a permits the passage of twice as much air as before. This alters the sensitivity of the apparatus. The illustrated throttle 38a can be replaced with one or more throttles which allow for the selection of a larger number of different sensitivities to even further enhance the reliability of the results of the testing operation.

By generating signals which constitute quotients of (first) signals denoting the pressure differentials and the comparison pressure (namely the pressure of stabilized fluid in the device 17), the computer 53 ensures that eventual fluctuations of stabilized pressure of the fluid in the device 17 cannot adversely influence the results of the testing operation. The reliability of ultimate signals is enhanced still further if the computer processes the first signals (denoting the pressure differentials between the interior and the exterior of the wrappers of successive articles 3 passing through the testing station between the valve plates 13 and 31), the second or comparison signals (denoting the pressure of stabilized fluid in the device 17) and the reference signals (denoting the pressure of atmospheric air) in the aforedescribed manner, namely by forming first difference signals from the first signals and reference signals, by forming second difference signals from comparison signals (denoting the pressure of stabilized fluid in the device 17) and reference signals, and by thereupon generating test signals from the quotient of the first and second difference signals. Such mode of processing the first signals, the comparison signals and the reference signals eliminates the influence of drift of the transducer or transducers upon the results of the testing operation as well as the influence of eventual fluctuations of pressure in the pressure stabilizing device 17. The reliability of ultimate signals is increased still further if the computer converts a series of successive reference signals into averaged or mean reference signals, if the computer converts a series of successive comparison signals into averaged or mean comparison signals, and if the aforediscussed first and second difference signals are generated by respectively processing the first signals and the averaged reference signals into first difference signals and by processing the averaged comparison and reference signals into second difference signals.

The establishment of a body of fluid medium (in the chamber 27) at the ends of successive wrappers whose pressure (namely the aforediscussed compensating pressure) reduces the likelihood of escape of testing fluid from the interior of the wrappers in the region of the respective sealing elements 18, the monitoring of such pressure by the transducer 49 and the generation of appropriate compensating pressure signals which are also processed by the computer 53 (e.g., to adjust the pressure in the corresponding pressure stabilizing device 41) reduces the likelihood of generation of misleading test signals because the pressure differential between the interior and the exterior of the wrapper advancing through the testing station is not influenced by uncontrolled flow of testing fluid between the interior of such wrapper and the surrounding atmosphere. The sealing elements 18 constitute a means for pneumatically segregating the interior of the wrappers from the surrounding atmosphere and thus prevent or reduce the likelihood of fluid flow in either direction (from the interior of the wrapper into the atmosphere or vice versa). The testing apparatus can be equipped with means for defining compensating chambers 27 at both ends of each wrapper which advances through the testing station. The purpose of monitoring the pressure in the chamber or chambers 27 is to ensure that such pressure matches or approximates the testing pressure and to thereby reduce the likelihood of inadequate sealing of the respective ends of wrappers and falsification of the results of tests due to leakage of fluid at the ends of the wrappers.

Repeated monitoring of reference, stabilizing (comparison) and compensating pressures (preferably in such a way that successive determinations of the aforediscussed pressure differentials alternate with the monitoring of reference, stabilizing and (if necessary) compensating pressures is desirable and advantageous because the computer 53 receives signals denoting the monitored reference, stabilizing and comparison pressures not later than after the determination of three successive pressure differentials (i.e., not later than upon completed testing of three successive wrappers). Thus, the apparatus can immediately react to any and all changes of stabilizing, reference and/or compensating pressure which even further reduces the likelihood of generation of misleading or inaccurate test signals. The results of the monitoring operation are even more reliable if all of the signals which the computer 53 receives are generated by one and the same transducer. This further reduces the likelihood of generation of inaccurate test signals because, if the transducer exhibits certain specific characteristics, they influence the generation of one type of signals to the same extent and in the same way as the generation of any other signal or signals.

FIGS. 6 to 8A show a portion of a modified testing apparatus wherein all such parts which are identical with or clearly analogous to the corresponding parts of the apparatus of FIGS. 1 to 5 are denoted by similar reference characters. Each of FIGS. 6-6A, 7-7A and 8-8A shows a different angular position of one flange (11b) of the conveyor. The filter mouthpiece 8 of a rod-shaped article 3 (a filter cigarette) abuts against a sealing element 18a during travel of such article through the testing station. The sealing element 18a is supported by the flange 11b; this sealing element is or can be identical with the sealing element 18 of FIG. 1. The flange 11b rotates in the direction of arrow 58 and successive increments of such flange thereby move along a stationary valve plate 78.

Figure 6:
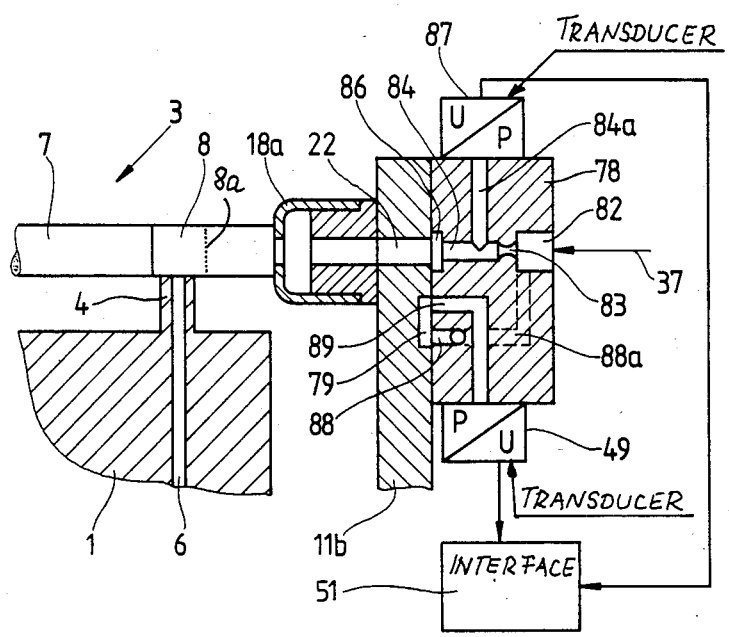
FIG. 6 is a fragmentary axial sectional view of a third testing apparatus.
Figure 6A:
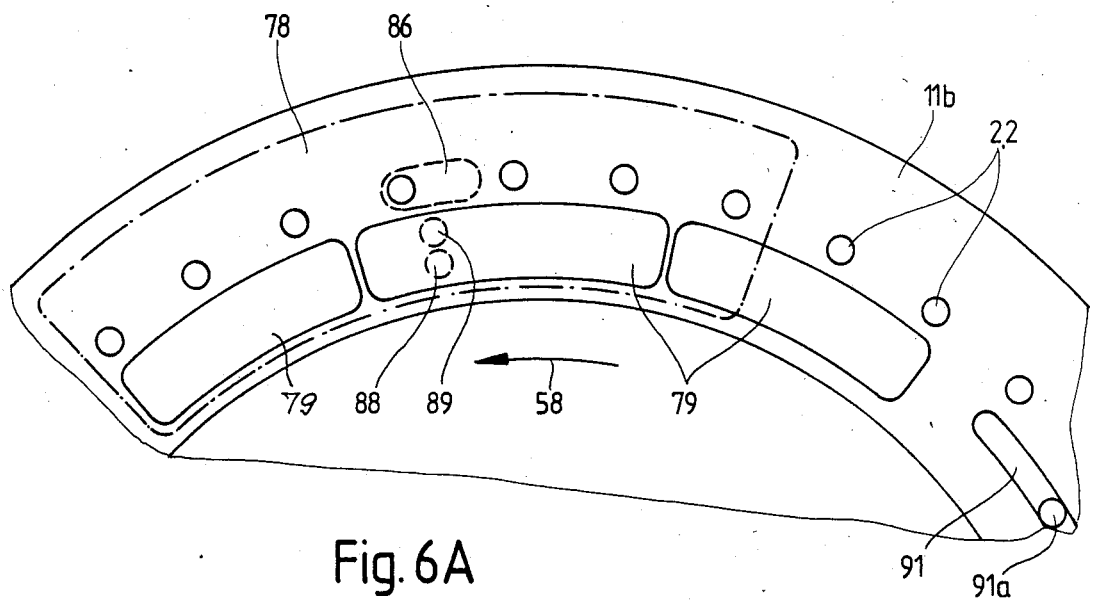
FIG. 6A is a fragmentary end elevational view as seen from the right-hand side of FIG. 6.

As can be seen in FIG. 6A, the flange 11b has axially parallel bores 22 which allow for the measurement of testing pressure in the interior of the wrapper of the article 3 advancing through the testing station. The admission or stabilized pressure slots 79 of the flange 11b are disposed radially inwardly of the bores 22. The valve plate 78 has an inlet 82 which is connected to the discharge end of the conduit 37 (the intake end of this conduit is connected to the pressure stabilizing device 17, the same as in the embodiment of FIGS. 1 to 5). The inlet 82 of the valve plate 78 is connected with a slot 86 by way of a flow restrictor 83 and a bore 84, and the slot 86 is in register with successive bores 22 when the flange 11b rotates in the direction of arrow 58. The bore 84 communicates with the intake of an electropneumatic transducer 87 by way of a radial bore 84a in the valve plate 78.

The valve plate 78 is further formed with a bore 88 which communicates with the inlet 82 by way of an additional bore or channel 88a. The bore 88 terminates in that surface of the valve plate 78 which is adjacent to the rotating flange 11b. An additional bore 89 in the valve plate 78 is connected with the transducer 49 whose output is connected to the interface 51. The output of the transducer 87 is also connected with the interface 51 which is connected with a computer corresponding to the computer 53 of FIG. 1. Thus, the computer can evaluate and process the signals which are generated by the transducer 49 as well as by the transducer 87. The relative positions of the slot 86 and bores 88, 89 in the valve plate 78 are indicated in FIG. 6A by broken lines.

FIG. 6A further shows that the three arcuate slots 79 of the flange 11b are bunched together and the width of the ribs or partitions between neighboring slots 79 is less than the diameter of a bore 88 or 89 in the valve plate 78. This renders it possible to carry out a continuous measurement of admission or stabilizing pressure as long as the bores 88, 89 communicate with at least one of the three slots 79. That arcuate section of the flange 11b which is formed with the slots 79 is followed by an arcuate section with arcuate slots 91 which communicate with the atmosphere. This can be readily seen in FIGS. 7 and 7A. Each of the slots 91 communicates with a bore 91a which is machined into the flange 11b and terminates at the inner side of such flange (see FIG. 7). The slots 91 are disposed at the same distance from the axis of the conveyor 1 as the bore 89 of the valve plate 78, and the mutual spacing of neighboring slots 91 is less than the diameter of the bore 89 (see FIG. 7A), i.e., the bore 89 communicates with at least one of the slots 91 as long as the arcuate section of the flange 11b containing the slots 91 moves along the stationary bore 89. This renders it possible to carry out an uninterrupted measurement of reference pressure.

The bore 88 communicates with the inlet 82 of the valve plate 78 and its open end is sealed by the outer side of the flange 11b while the bore 89 communicates with one or more slots 91.

The arcuate section containing the arcuate slots 91 is followed by a further section of the flange 11b which contains a series of neighboring substantially T-shaped slots 92 (FIGS. 8 and 8A) serving to facilitate the ascertainment of testing pressure. Each slot 92 includes a radially extending portion 93 and a circumferentially extending portion 94. The portions 94 can communicate with the bore 89 of the valve plate 78 (i.e., with the intake of the transducer 49), and the portions 93 can communicate with successive bores 22 of the flange 11b to connect such bores with the respective arcuate portions 94.

Figure 7:
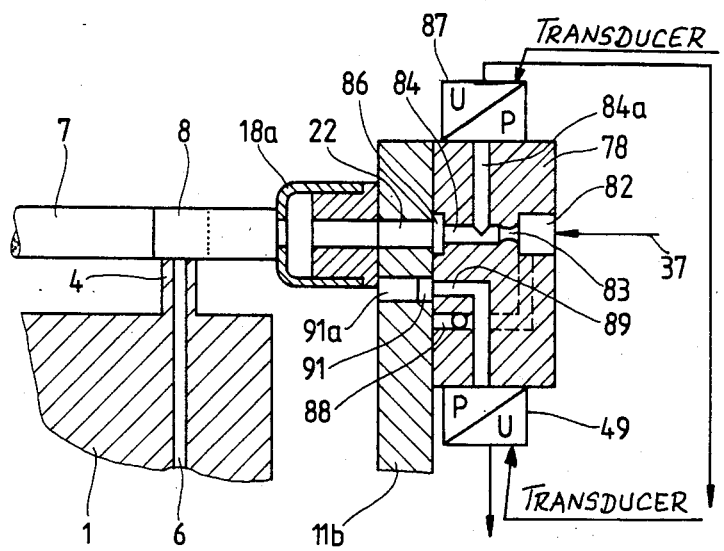
FIG. 7 is a fragmentary axial sectional view corresponding to that of FIG. 6 but showing the testing conveyor in a different angular position.
Figure 7A:
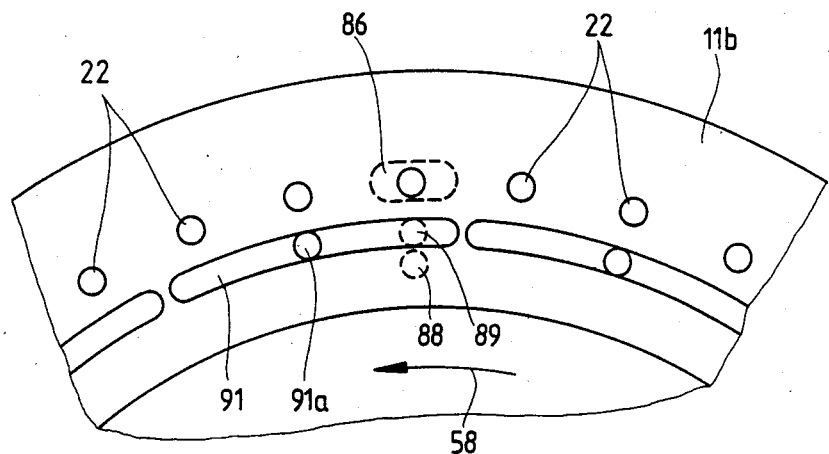
FIG. 7A is an end elevational view as seen from the right-hand side of FIG. 7.
Figure 8:
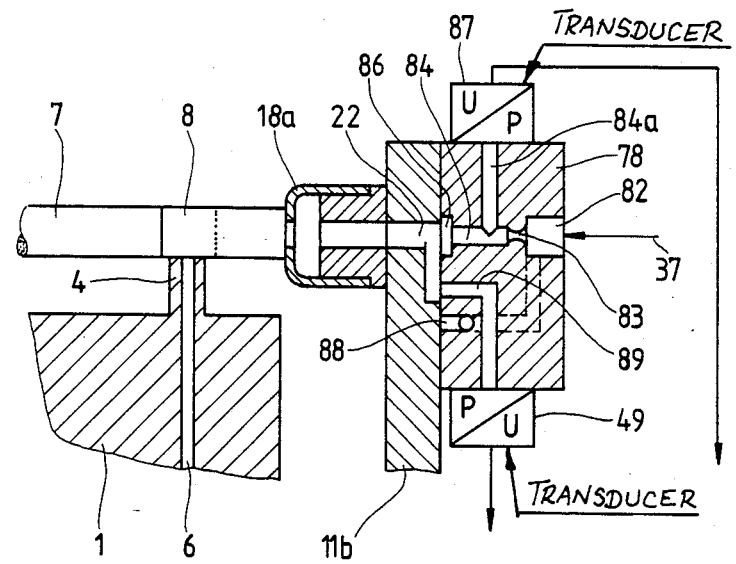
FIG. 8 is a fragmentary axial section view corresponding to that of FIGS. 6 or 7 but showing the testing conveyor in a third angular position.
Figure 8A:
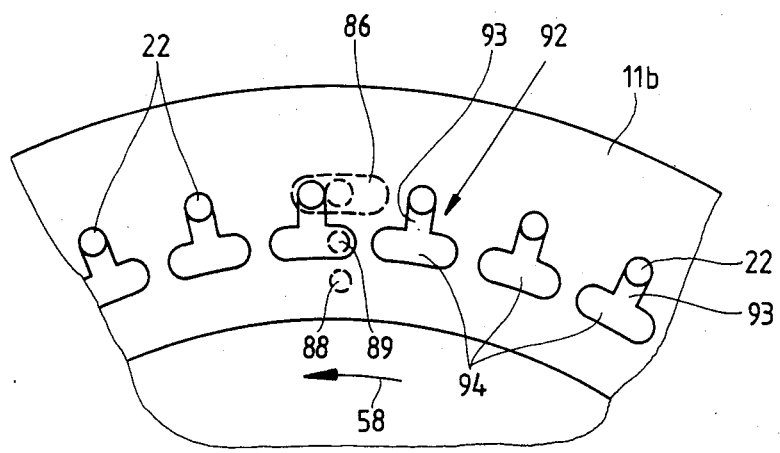
FIG. 8A is an end elevational view as seen from the right-hand side of FIG. 8.

When an article 3 is to be tested in the apparatus of FIGS. 6 to 8, the conduit 37 supplies testing fluid at admission pressure from the pressure stabilizing device 17 to the inlet 82 of the valve plate 78. Such fluid is admitted into the interior of the wrapper of an article 3 at the testing station by way of the flow restrictor 83, bore 84, slot 86, bore 22 and the corresponding sealing element 18a. The testing pressure is monitored by the transducer 87 downstream of the flow restrictor 83. The fluid at admission or stabilized pressure is further supplied to the bore or channel 88a, bore 88 and one of the slots 79 and bore 89 to the transducer 49 which is thus in a position to monitor the admission or stabilized pressure. In other words, the testing pressure (transducer 87) is monitored simultaneously with stabilized pressure (transducer 49), and such monitoring takes place while the conveyor including the flange 11b completes approximately one-third of its revolution. When the last of the series of three slots 79 advances beyond the bore 89 in the stationary valve plate 78, the measurement of stabilized pressure by the transducer 49 is interrupted. The distance between the last slot 79 and the nearest slot 91 exceeds the diameter of the bore 89 (see FIG. 6A). The bore 89 then advances along the stationary valve plate 78 before it reaches the foremost slot 91 which connects it with the atmosphere by way of the corresponding bore 91a (FIGS. 7 and 7A). The then prevailing (reference) pressure in the bore 89 is monitored by the transducer 49. The measurement of reference pressure takes place in parallel to the measurement of testing pressure and takes up the interval of time which elapses while the conveyor 1 including the flange 11b completes approximately one-third of its revolution. Such interval is followed by an interval (during which the flange 11b completes the last third of its revolution) of simultaneous measurement of testing pressure in the interior of the wrapper of the article 3 at the testing station by the transducers 49 and 87. This is due to the fact that, at such time, the slots 92 of the flange 11b connect the respective bore or socket 22 with the bore 89 in the stationary valve plate 78 so that the input of the transducer 49 receives fluid at testing pressure. All of the signals which are generated by the transducers 49 and 87 are transmitted to the interface 51 which transmits the signals to the computer 53 wherein the signals are processed in a manner as described in connection with the embodiment of FIGS. 1 to 4. The signals at the output of the computer are indicative of the quality of tested articles 3.

The computer can process the signals from the transducer 49 in the same way as described in connection with FIGS. 1-4, and the resulting signals are then utilized to modify the signals which are generated by the transducer 87 to furnish test signals which can be used to segregate defective rod-shaped articles and/or to adjust the operation of the machine or production line which turns out the articles.

The method which can be practiced with the apparatus of FIGS. 6 to 8A exhibits the advantage that it renders it possible to prolong the intervals of measurement of the pressure differential for successive wrappers. Thus, the second transducer 87 also generates signals which are indicative of the pressure differential between the interior and the exterior of the wrapper advancing through the testing station. The computer thereupon processes the signals which are generated by the two transducers 49 and 87 in the aforedescribed manner, namely signals which are generated by the transducer 49 are processed and the processed signals are used to modify the signals from the transducer 87 to obtain test signals. The transducer 49 generates a series of different signals in a given sequence (e.g., pressure differential signals alternating seriatim with comparison (stabilized) pressure signals, reference signals and (if necessary) stabilizing pressure signals). All signals which are generated by the transducer 49 during a cycle are stored and are thereupon processed to form first test signals which are used to modify signals transmitted by the transducer 87 in order to form second or final test signals.

An advantage of the method which can be practiced with the apparatus of FIGS. 6 to 8A is that an entire cycle is available for monitoring of the pressure differential between the interior and the exterior of each wrapper. The accuracy of the slower transducer 87 can substantially exceed that of the more rapidly reacting transducer 49 which also contributes to greater reliability of the ultimate test results.

Figure 9:
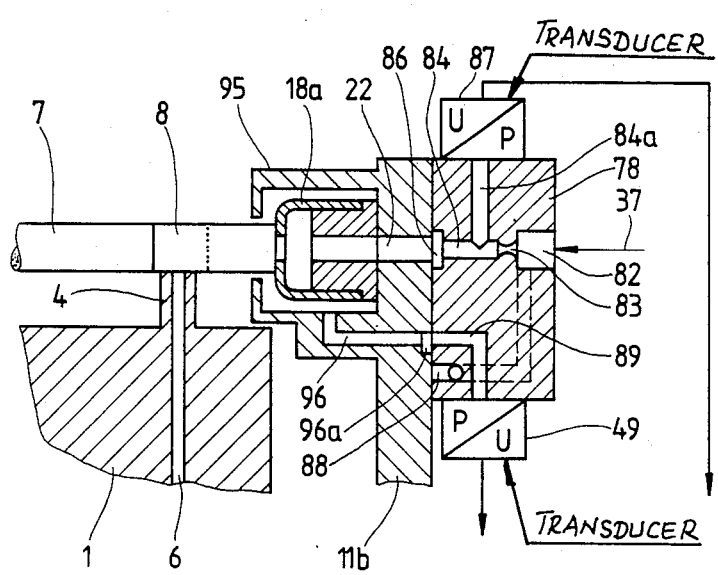
FIG. 9 is a fragmentary axial sectional view of a testing apparatus which constitutes a slight modification of the apparatus shown in FIGS. 6 to 8A.

FIG. 9 illustrates a slight modification of the apparatus which is illustrated in FIGS. 6 to 8A. The filter mouthpiece 8 of the rod-shaped article is partially surrounded by a compensating chamber in a housing 95 which serves to compensate for losses as a result of inadequate sealing of the corresponding end of the article by the sealing element 18a. The chamber in the housing 95 is maintained at compensating pressure by gaseous fluid which is admitted by way of a bore 96 and a slot 96a in the rotating flange 11b as well as the bore 89 of the valve plate 78 (the bore 89 is connected with the input of the transducer 49). The flange 11b has several bores 96 and several slots 96a which are respectively similar to the bores 91a and slots 91 shown in FIGS. 7 and 7A. The slots 96a extend along an arc of approximately 90 degrees, the same as the slots 79, 91 and 92 in the apparatus which embodies the structure of FIG. 6A. In other words, the apparatus of FIG. 9 monitors the admission of stabilizing pressure, the reference pressure, the testing pressure and the compensating pressure of the fluid medium during successive quarter turns of the flange 11b. The thus obtained signals are stored during one revolution of the conveyor 1 and are processed to furnish the desired test signals.

Figure 10:
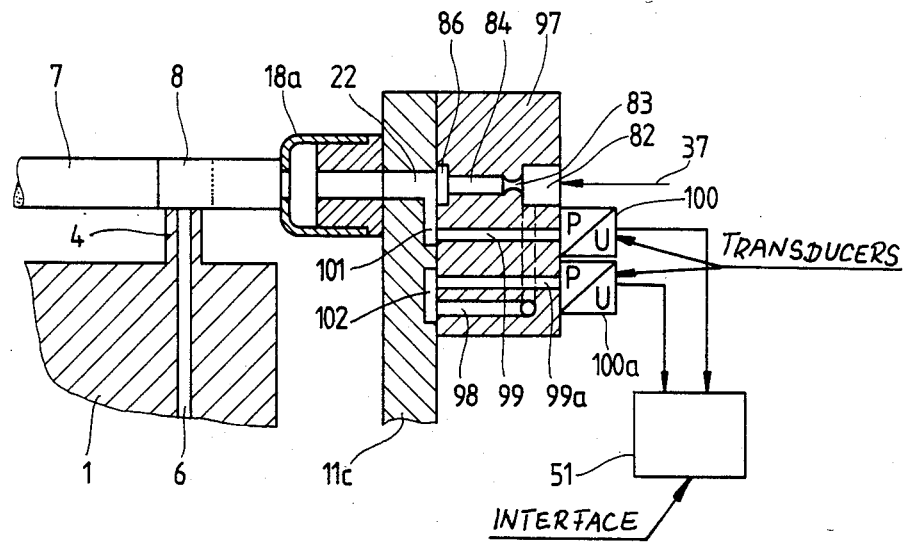
FIG. 10 is a fragmentary axial sectional view of a further testing apparatus.
Figure 10:
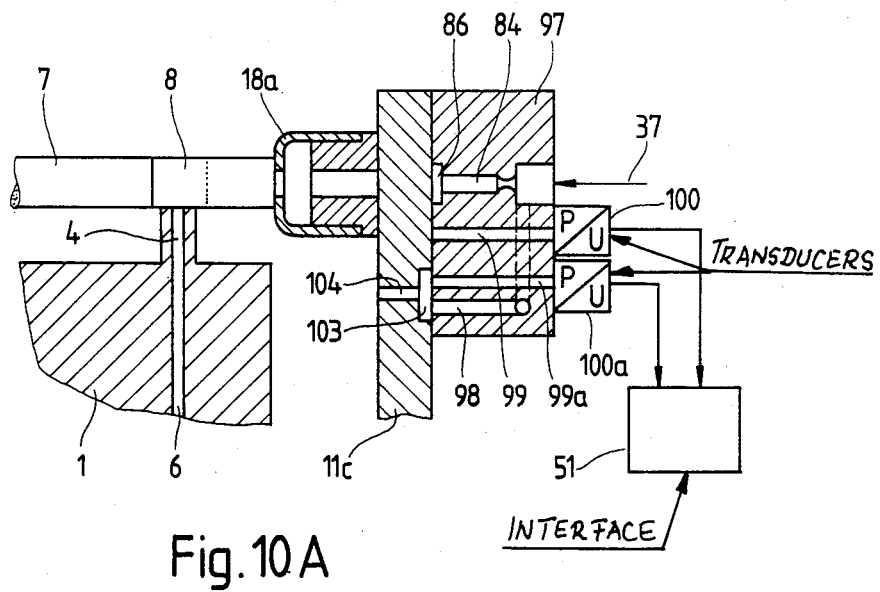

FIGS. 10 and 10A show a further embodiment of the improved testing apparatus. The stationary valve plate 97 corresponds to the valve plate 31 or 78 and is formed with an inlet 82 communicating with the first pressure stabilizing device 17 (not shown in FIGS. 10 and 10A) by the conduit 37. The inlet 82 communicates with a slot 86 by way of a bore 84 which contains a flow restrictor 83. Furthermore, the inlet 82 communicates with a bore 98 which is located radially inwardly of the bore 84. Two additional bores 99 and 99a are provided in the valve plate 97 between the bores 84 and 98. One end portion of each of the bores 98, 99 terminates in that surface of the valve plate 97 which is in sealing contact with the rotating flange 11c and the other end portions of the bores 98, 99 respectively communicate with the intakes of two transducers 100 and 100a.

That side or surface of the flange 11c which contacts the stationary valve plate 97 is formed with radially extending recesses or slots 101 each of which is in permanent communication with one of the bores or sockets 22 and each of which extends radially inwardly from the respective bore 22 and can temporarily connect such bore 22 with the bore 99 of the valve plate 97. Thus, the slots 101 can connect the slot 86 of the valve plate 97 with the bore 99 to allow for measurement of testing pressure by the transducer 100. The flange 11c is further formed with slots or recesses 102 which are disposed radially inwardly of the recesses or slots 101 and can establish communication between the bores 98 and 99a of the valve plate 97. The recess 102 of FIG. 10 establishes communication between the bores 98 and 99a at the time when the recess or slot 101 establishes communication between the bore 84 and the bore 99. The transducer 100a generates signals denoting the monitored admission or stabilized pressure. Such monitoring of stabilized pressure takes place simultaneously with monitoring of testing pressure.

FIG. 10A shows the flange 11c in a different angular position with reference to the stationary valve plate 97. The illustrated portion of the flange 11c has an arcuate recess or slot 103 which is connected with the atmosphere by an axially parallel bore 104 and is located at the level of the slot or slots 102 so that it can communicate with the bores 98 and 99a in the corresponding angular position or positions of the testing conveyor 1. This enables the transducer 100a to monitor the reference pressure. The manner in which the signals from the transducers 100 and 100a are transmitted to the computer (not shown) by way of the interface 51 is the same or analogous to that described in connection with the embodiment of FIGS. 1 to 4. The transducer 100 also generates reference signals and the computer preferably converts the first (testing pressure) signals and the reference signals which are generated by the transducer 100 into first difference signals while the stabilized pressure and reference signals which are generated by the transducer 100a are converted into second difference signals. The computer thereupon preferably processes the first and second difference signals by forming a quotient which is the actual test signal.

An advantage of the apparatus which is shown in FIGS. 10 and 10A is that fluctuations of admission or stabilized pressure are ascertained directly in correlation to the corresponding test signals (the test pressure is influenced by fluctuations of stabilized pressure). This renders the ascertained test signals even more reliable.

The apparatus of FIGS. 10 and 10A allows for continuous compensation for deviations of stabilizing or compensating pressure from an optimum value. This is achieved in that the transducer 100 generates signals denoting the pressure differentials and reference pressure, and the transducer 100a generates signals denoting the reference pressure and the stabilizing or compensation pressure. The computer 53 (e.g., a microcomputer) can be readily selected and programmed in such a way that it generates first difference signals from those which are transmitted by the output of the transducer 100, that it generates second difference signals from signals which are transmitted by the output of the transducer 100a, and that it thereupon forms a quotient of the first and second difference signals. Thus, each and every quotient signal is formed by full consideration of the then prevailing comparison or stabilizing pressure.

As shown in the apparatus of FIGS. 1 to 4, a gaseous testing fluid at the admission or stabilized pressure can be admitted into both ends of the wrapper of an article passing through the testing station. However, it is equally possible to admit testing fluid into one end only of each wrapper advancing through the testing station. Furthermore, the stabilized pressure and the testing pressure are monitored at one and the same end of each article 3. However, it is equally within the purview of the invention to apply stabilized pressure only to one end of the wrapper of each article to be tested, to ascertain the stabilized pressure at such one end of the wrapper, and to monitor the testing pressure at the other end of the respective article. This does not alter the basic mode of operation of the improved testing apparatus.

It has been found that the improved method and apparatus allow for highly accurate testing of the wrappers of rod-shaped articles of the tobacco processing industry even if the articles to be tested advance through the testing station at a frequency such as is required in a mass-producing filter cigarette making, cigarette making, filter rod making or like machine. The method and apparatus can exclude the undesirable influences of variable parameters which influence the results of measurements in accordance with heretofore known methods and in heretofore known apparatus. This holds particularly true for fluctuations of the stabilizing pressure (compensating pressure) which directly and appreciably influence the results of measurements. Furthermore, and as explained above, the improved method and apparatus can eliminate the effect of fluctuations of compensating pressure and thus ensure that leakage at one or both ends of each wrapper passing through the testing station is minimal or non-existent. Still further, and as described with reference to FIG. 3, the sensitivity range of the testing apparatus can be selected to correspond to the anticipated permeability of the wrappers of tested articles.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A method of ascertaining the condition of open-ended wrappers of a series of rod-shaped articles of the tobacco processing industry, comprising the steps of admitting a gaseous testing fluid into the wrappers of successive articles of said series so as to establish between the interior and the exterior of each wrapper a pressure differential which is indicative of the condition of the respective wrapper; monitoring the pressure differential for each wrapper and generating first signals denoting the monitored pressure differentials; generating a succession of comparison signals; and processing said first signals and said comparison signals, including forming quotient signals and converting said quotient signals into test signals.

2. The method of claim 1, wherein the step of generating said comparison signals comprises establishing a source of testing fluid for admission into the wrappers of successive articles, stabilizing the pressure of testing fluid in said source and generating signals which constitute said comparison signals and denote the stabilized pressure of testing fluid in said source.

3. The method of claim 1, further comprising the steps of generating a succession of reference signals each of which is indicative of a predetermined fluid pressure, converting said reference signals and said first signals into first difference signals, and converting said comparison signals and said reference signals into second difference signals, said forming step including converting said first and second difference signals into said quotient signals.

4. The method of claim 3, further comprising the steps of generating averaged reference signals each of which is indicative of the average value of a plurality of successive reference signals and utilizing such averaged reference signals for the generation of said first and second difference signals.

5. The method of claim 3, further comprising the steps of generating averaged comparison signals each of which is indicative of the average value of a plurality of successive comparison signals and utilizing such averaged comparison signals for the generation of said second difference signals.

6. The method of claim 1, wherein said admitting step includes maintaining the testing fluid at a given pressure and further comprising the steps of sealing at least one open end of each wrapper in the course of said admitting step so as to pneumatically segregate the interior of the wrapper from the surrounding area in the course of said monitoring step, establishing a supply of fluid medium around the one end of each wrapper in the course of the admitting step, and maintaining the fluid medium at a stabilized pressure which at least approximates said given pressure so as to minimize leakage of testing fluid at the one end of the wrapper in the course of the admitting and monitoring steps.

7. The method of claim 6, further comprising the step of generating a signal denoting the stabilized pressure of the fluid medium in alternation with predetermined successive monitoring steps.

8. The method of claim 7, wherein each of said signal generating steps involves the utilization of one and the same electropneumatic transducer.

9. The method of claim 1, further comprising the step of generating a succession of reference signals each of which is indicative of a predetermined fluid pressure, said monitoring steps being carried out alternatingly with the generation of said comparison and reference signals.

10. The method of claim 9, wherein each of said signal generating steps involves the utilization of one and the same transducer.

11. The method of claim 1, further comprising the steps of ascertaining the pressure differential for each wrapper independently of said monitoring step and generating additional signals denoting the thus ascertained pressure differential, said processing step including modifying said additional signals as a function of the characteristics of said quotient signals.

12. The method of claim 11, further comprising the step of generating a succession of reference signals in a predetermined sequence with the generation of said first signals and said comparison signals by means of one and the same transducer, said forming step including storing predetermined numbers of first, reference and comparison signals and converting the stored signals into said quotient signals.

13. The method of claim 1, wherein said first signals and said comparison signals are generated by discrete first and second transducers and further comprising the step of generating by each of the first and second transducers a succession of reference signals each of which is indicative of a predetermined fluid pressure, said forming step including converting said first signals and said reference signals into first difference signals, converting said comparison signals and said reference signals into second difference signals and converting said first and second difference signals into said quotient signals.

14. Apparatus for ascertaining the condition of open-ended wrappers of a series of rod-shaped articles of the tobacco processing industry, comprising conveyor means for transporting the articles of said series along a predetermined path; control means for establishing a pressure differential between the interior and the exterior of the wrapper of each of said series of articles in a predetermined portion of said path; means for monitoring the pressure differential for each of the wrappers and for generating first signals denoting the respective pressure differentials; a source of gaseous fluid; means for generating comparison signals denoting the pressure of gaseous fluid in said source; and means for evaluating said first signals and said comparison signals, and for forming test signals denoting a quotient of said first signals and said comparison signals.

15. The apparatus of claim 14, wherein said source includes a device for stabilizing the pressure of gaseous fluid and said comparison signals denote such stabilized pressure, said control means including means for supplying gaseous fluid from said source into at least one end of the wrapper in said predetermined portion of said path.

16. The apparatus of claim 15, further comprising a source of compressed gaseous fluid and means for supplying such fluid to said device.

17. The apparatus of claim 15, wherein said control means comprises at least one mobile component which shares the movements of said conveyor means and at least one stationary component adjacent to said mobile component and connected to said source as well as to said signal generating means, said components having means for connecting said signal generating means with said device and with the interior of the wrapper in said predetermined portion of said path.

18. The apparatus of claim 17, further comprising means for generating reference pressure signals, said evaluating means being arranged to process such reference pressure signals together with said first signals and said comparison signals.

19. The apparatus of claim 18, wherein said evaluating means comprises means for forming first difference signals from said first signals and said reference signals, for forming second difference signals from said comparison signals and said reference signals, and for forming a quotient of said first and second difference signals.

20. The apparatus of claim 19, wherein said evaluating means further comprises means for converting predetermined numbers of successive reference signals into averaged reference signals and for converting predetermined numbers of successive comparison signals into averaged comparison signals, said first difference signals being formed from said first signals and said averaged reference signals and said second difference signals being formed from said averaged reference signals and said averaged comparison signals.

21. The apparatus of claim 14, wherein said evaluating means comprises a computer and an interface connecting said computer with said signal generating means.

22. The apparatus of claim 14, wherein said source includes a device for stabilizing the pressure of said gaseous fluid and said comparison signals denote such stabilized pressure, said control means including means for supplying gaseous fluid at stabilized pressure from said source into at least one end of the wrapper in said predetermined portion of said path, and further comprising means for equalizing the pressure of gaseous fluid between said source and said portion of said path.

23. The apparatus of claim 22, wherein said pressure equalizing means comprises a compartment provided in said control means and means for connecting said compartment with the atmosphere.

24. The apparatus of claim 14, further comprising means for connecting said source with said control means, said connecting means comprising an adjustable throttle.

25. The apparatus of claim 24, wherein said adjustable throttle has a plurality of apertures for admission of gaseous fluid from said source into said control means and means for selectively sealing at least one of said apertures to thereby vary the rate of flow of gaseous fluid to said control means.

26. The apparatus of claim 14, further comprising means defining a compensating chamber surrounding at least one end of the wrapper in said portion of said path and means for maintaining the pressure in said chamber at a value which at least approximates the pressure in the interior of the wrapper advancing along said portion of said path so as to minimize the communication between said at least one end of such wrapper and the surrounding atmosphere.

27. The apparatus of claim 26, wherein said control means includes a sealing element which engages the one end of the wrapper advancing along said portion of said path, at least a portion of said sealing element being confined in said chamber.

28. The apparatus of claim 26, wherein said pressure maintaining means includes a pressure stabilizing device containing a supply of gaseous fluid at a pressure at least approximating the pressure in the interior of the wrapper advancing along said portion of said path and means for supplying gaseous fluid from said device to said chamber.

29. The apparatus of claim 26, further comprising means for generating signals denoting the pressure of fluid in said chamber.

30. The apparatus of claim 29, further comprising means for recording and/or displaying the signals denoting the pressure in said chamber.

31. The apparatus of claim 29, wherein said monitoring means constitutes said means for generating said comparison signals and the signals denoting the pressure of fluid in said chamber.

32. The apparatus of claim 14, wherein said monitoring means constitutes said means for generating said comparison signals.

33. The apparatus of claim 14, wherein said monitoring means comprises a first transducer which constitutes said means for generating comparison signals and further comprising a discrete second transducer arranged to monitor said pressure differential and to generate additional first signals, said evaluating means including means for modifying the additional first signals by said test signals.

34. The apparatus of claim 33, further comprising a source of gas at a predetermined reference pressure, said first transducer being arranged to generate reference signals denoting such reference pressure and said evaluating means being arranged to process such reference signals with said first signals and said comparison signals into said test signals.

35. The apparatus of claim 14, wherein said monitoring means comprises a first transducer and said means for generating comparison signals comprises a second transducer, said control means comprising means for effecting the generation of first and second reference signals by said first and second transducers, respectively, and said evaluating means including means for converting the first signals and the reference signals generated by said first transducer into first difference signals, for converting said comparison signals and the reference signals generated by said second transducer into second difference signals, and for forming a quotient from said first and second difference signals.

36. The apparatus of claim 35, wherein said control means comprises means for effecting the generation of first reference signals alternatingly with said first signals and for effecting the generation of said second reference signals alternatingly with said comparison signals.

37. The apparatus of claim 14, wherein the fluid in said source is maintained at an admission pressure, said control means including means for supplying the fluid from said source into at least one end of the wrapper in said predetermined portion of said path and said comparison signals denoting said admission pressure.

* * * * *